April 1, 1958   M. LABARRE   2,828,508
MACHINE FOR INJECTION-MOULDING OF PLASTIC ARTICLES
Filed March 18, 1954   9 Sheets-Sheet 1

INVENTOR
Maurice Labarre
BY
Curtis, Morris + Safford
ATTORNEYS

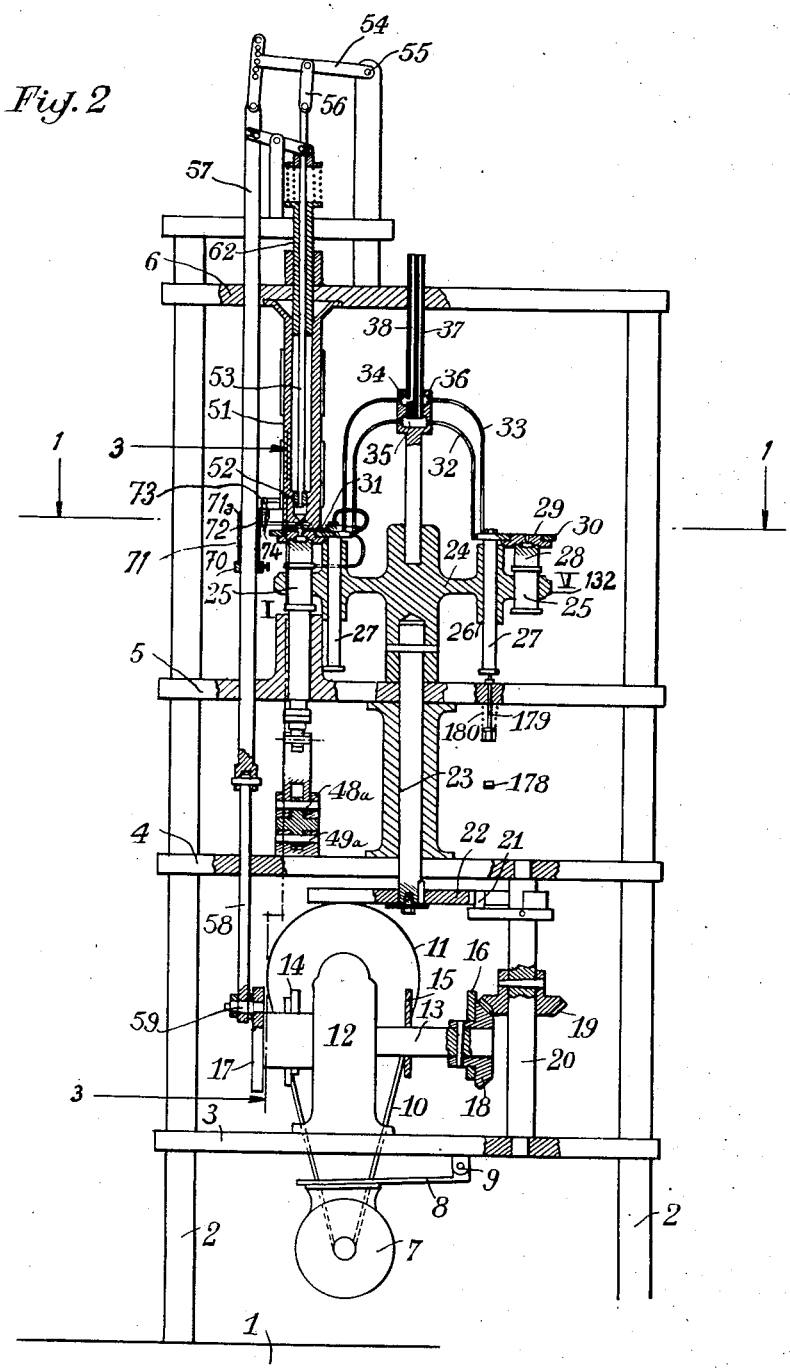

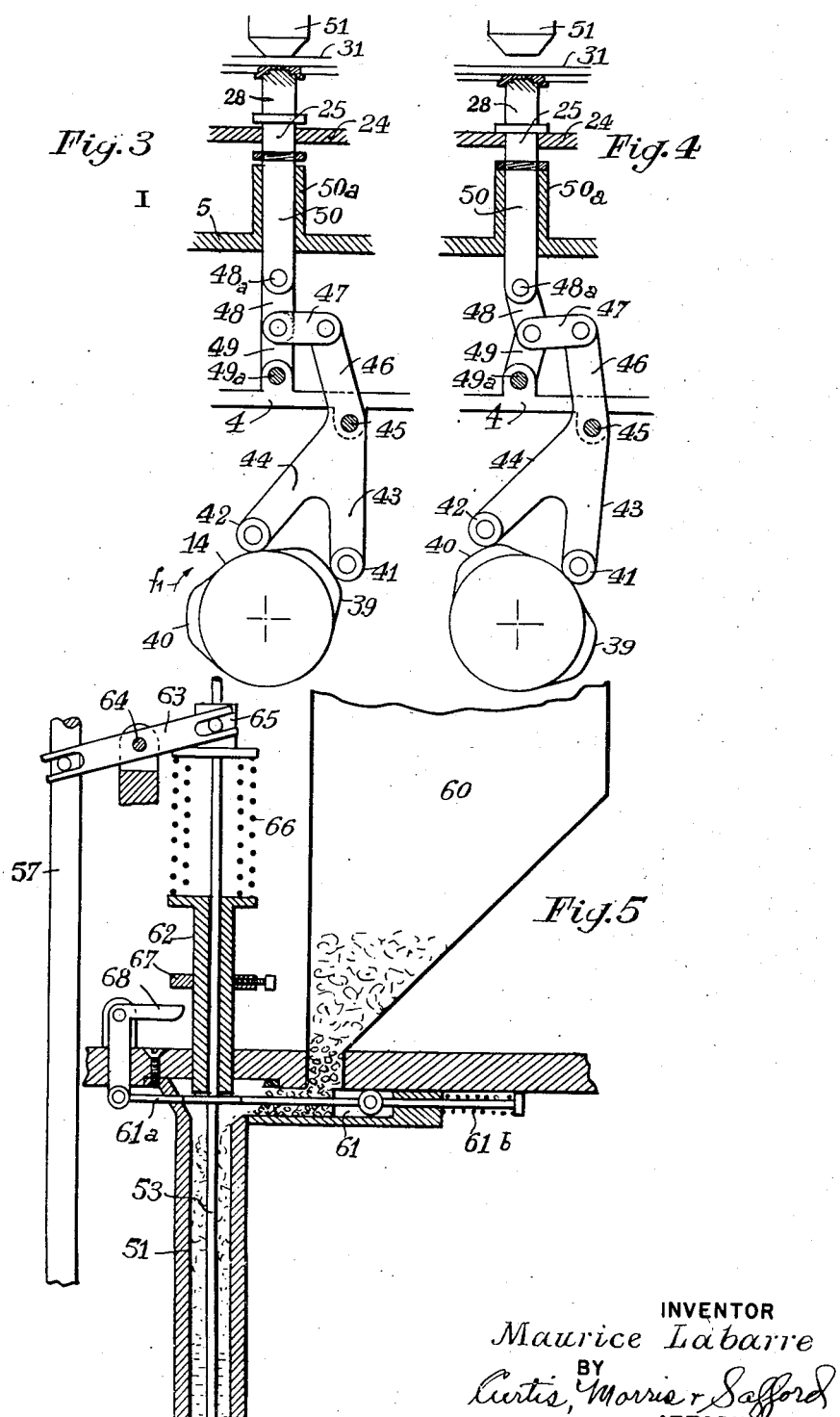

April 1, 1958          M. LABARRE          2,828,508
MACHINE FOR INJECTION-MOULDING OF PLASTIC ARTICLES
Filed March 18, 1954          9 Sheets-Sheet 4
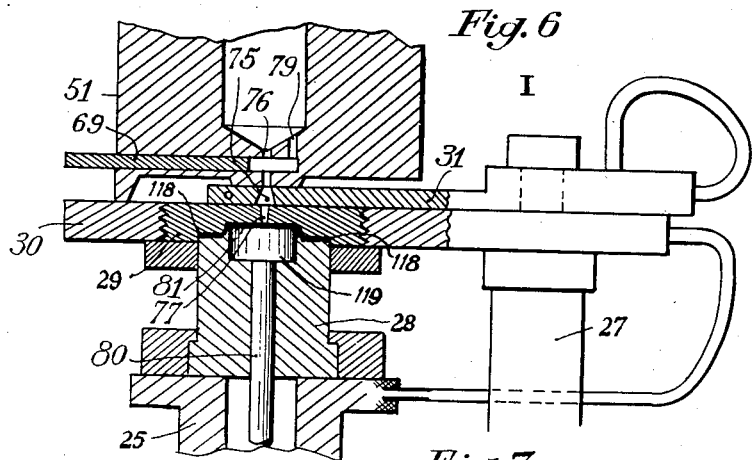
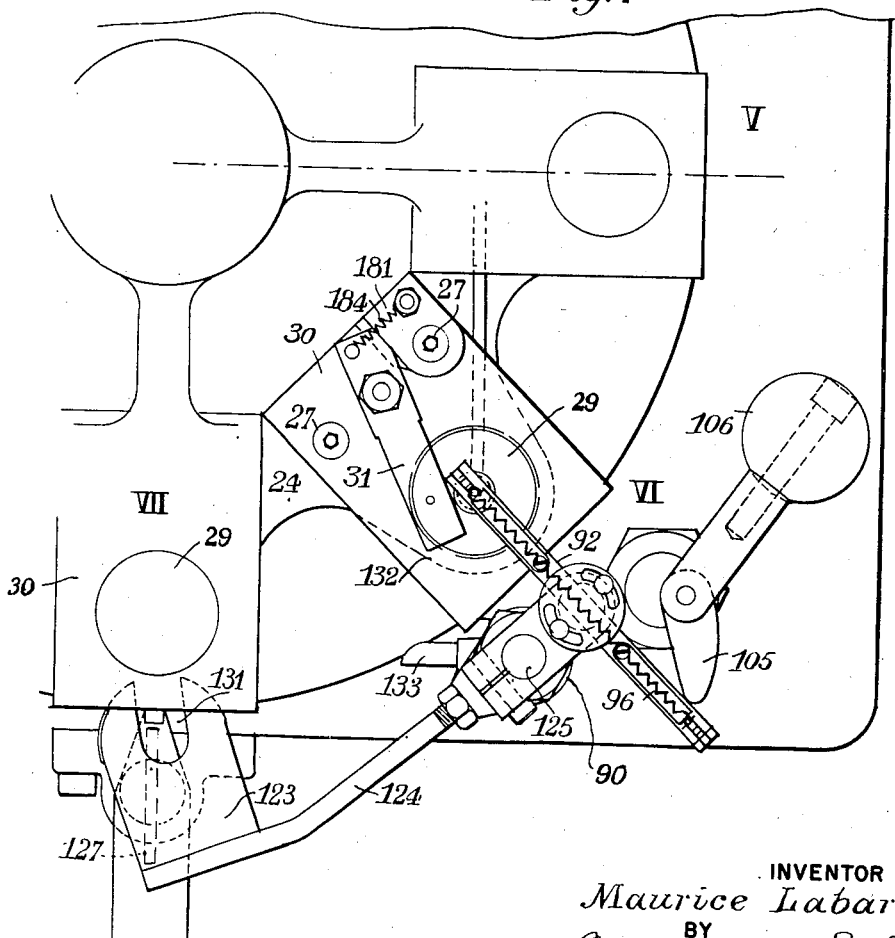
INVENTOR
Maurice Labarre
BY
Curtis, Morris + Safford
ATTORNEYS April 1, 1958 M. LABARRE 2,828,508
MACHINE FOR INJECTION-MOULDING OF PLASTIC ARTICLES
Filed March 18, 1954 9 Sheets-Sheet 5
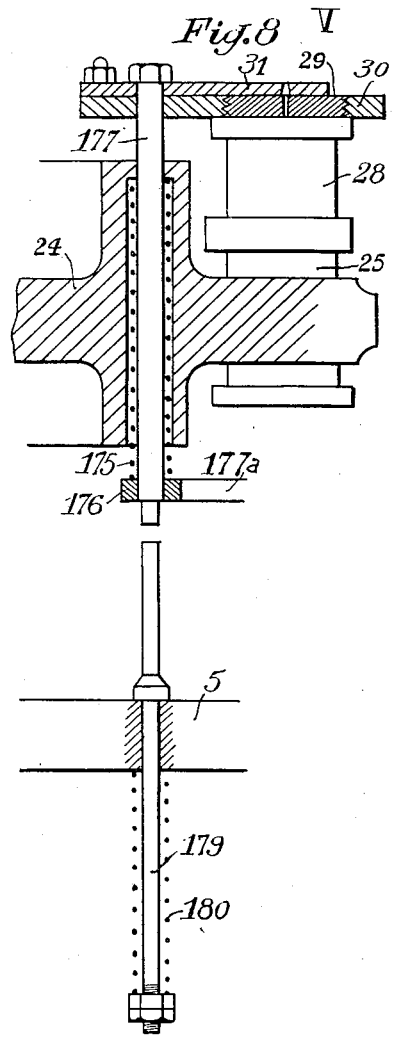
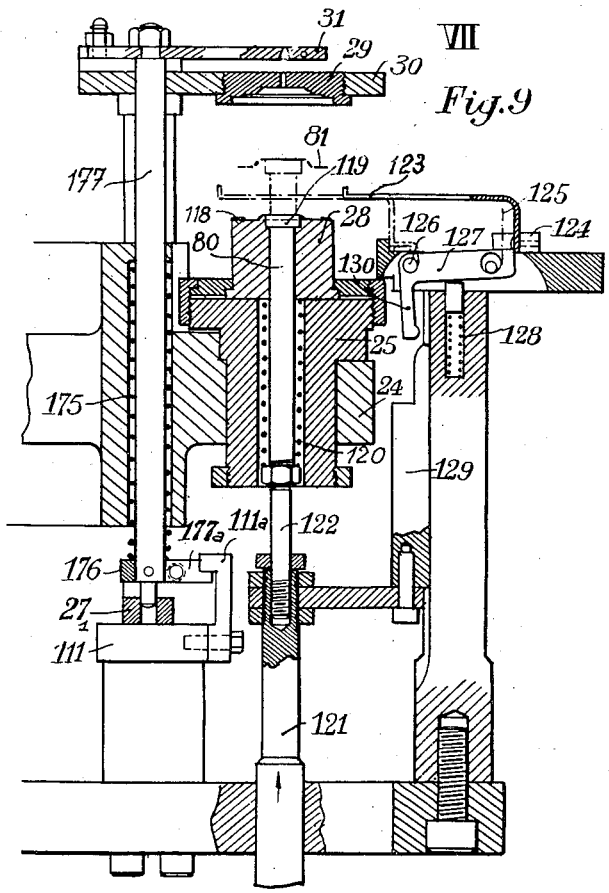
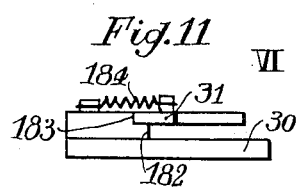
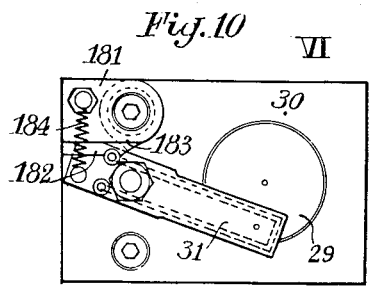
INVENTOR
Maurice Labarre
BY
Curtis, Morris & Safford
ATTORNEYS

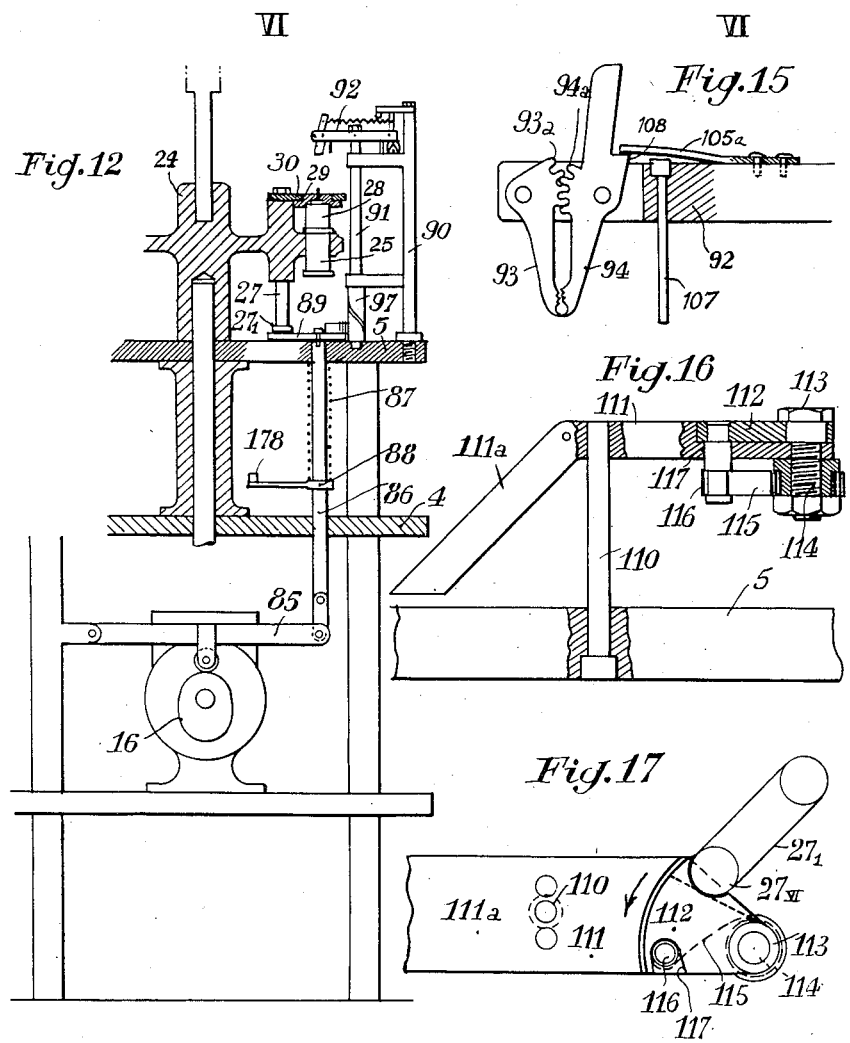

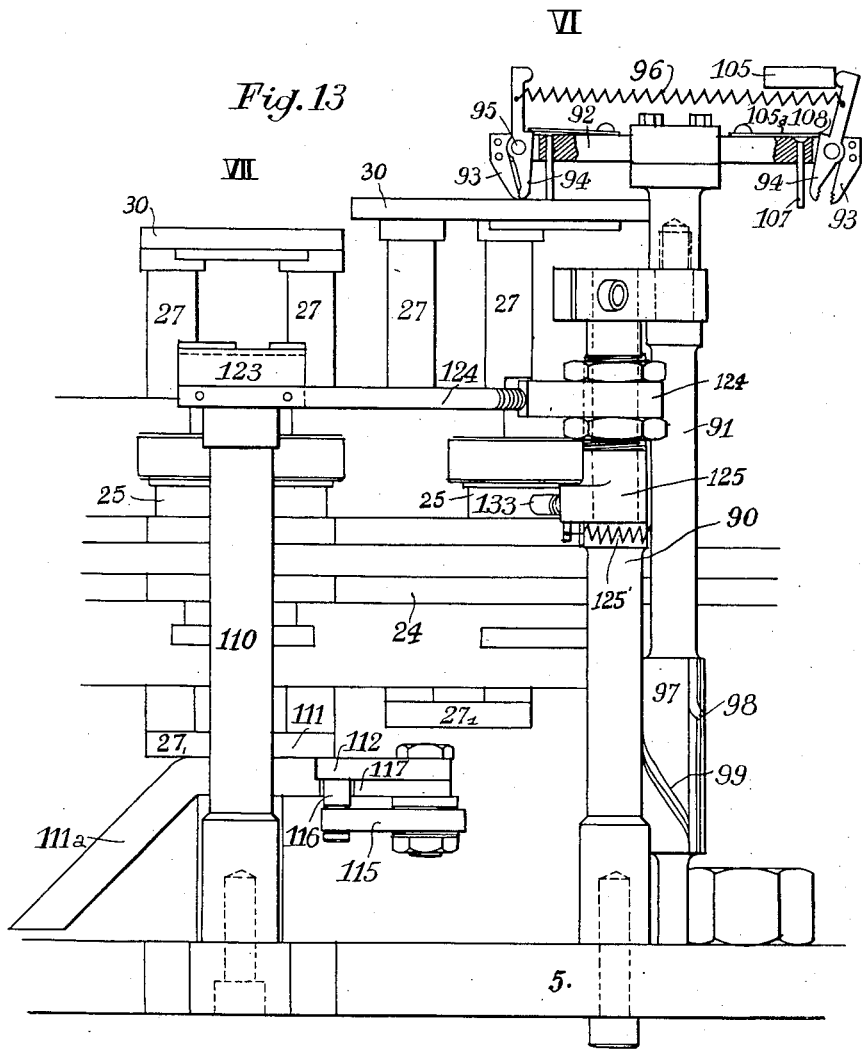

April 1, 1958 M. LABARRE 2,828,508
MACHINE FOR INJECTION-MOULDING OF PLASTIC ARTICLES
Filed March 18, 1954 9 Sheets-Sheet 8
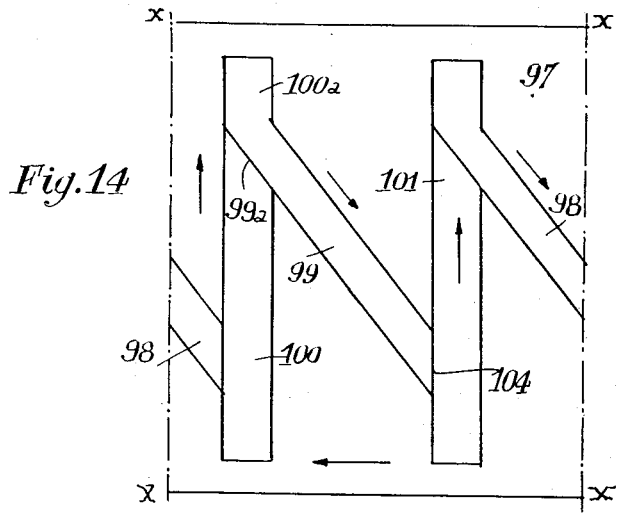
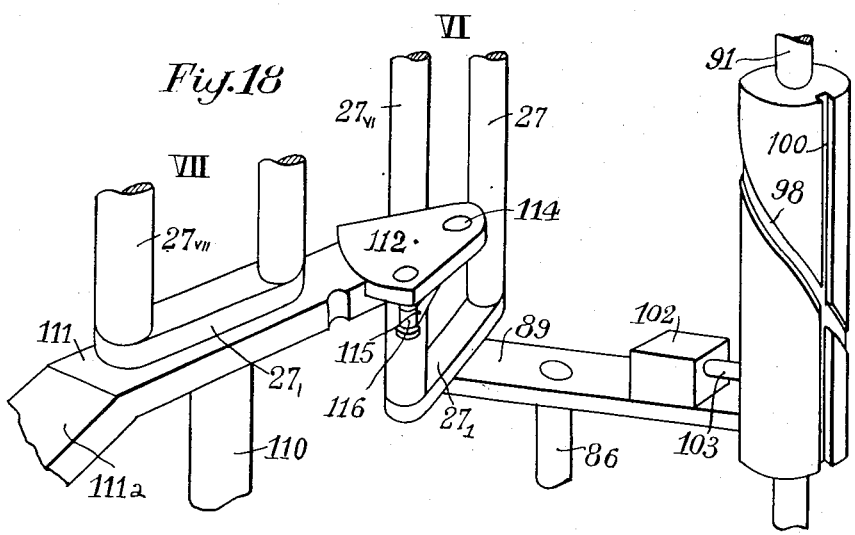
INVENTOR
Maurice Labarre
BY
Curtis, Morris + Safford
ATTORNEYS April 1, 1958 M. LABARRE 2,828,508
MACHINE FOR INJECTION-MOULDING OF PLASTIC ARTICLES
Filed March 18, 1954 9 Sheets-Sheet 9

INVENTOR
Maurice Labarre
BY
Curtis, Morris + Safford
ATTORNEYS

United States Patent Office 2,828,508
Patented Apr. 1, 1958

2,828,508

MACHINE FOR INJECTION-MOULDING OF PLASTIC ARTICLES

Maurice Labarre, Paris, France, assignor to Societe Anonyme dite: Specialites Alimentaires Bourguignonnes (S. A. B.), Dijon, France, a corporation of France Application March 18, 1954, Serial No. 417,133

Claims priority, application France February 1, 1954

13 Claims. (Cl. 18—30)

My invention relates to an injection-moulding machine for the manufacture of articles made of a plastic material such as polyethylene, polyamide, and the like. The said machine is more especially designed for the casting of parts which are light or very light in weight although it can likewise be used in the casting of heavier parts.

It is well known that conventional injection-moulding machines are designed for the manufacture of comparatively heavy articles, and this, at a rather low rate and the parts being obtained in clusters. Consequently, where it is desired to produce parts that are very light in weight, e. g. less than one gram, with the aid of the aforementioned known machines, it is necessary, in view of the inaccurate and too slow character of the feed, to cast such light parts in manifold molds in which the material is conveyed to the individual molds through as many runners leading from a common central injection shaft. Naturally, this results in a considerable scrap.

As the parts come out in variable numbers from injection-moulding machines of the kind referred to, they are attached by stems to the common head, and overall weight of these often exceeds the total weight of the parts themselves, more particularly where same are packings for use in capping bottles, flasks and like vessels. Said scrap must then be severed from the parts and crushed over again. Automatic severing requires elaborate and costly molds, which makes this proposition practically prohibitory. Now, with the most refined present machines, the severing of the parts and the grinding of the scrap involve considerable labor costs. Where such machines are used for the manufacture of packings, their output does not exceed ⅕ of their capacity, for the reason that they are high-duty slow-running machines.

Effectively, the power consumed by such machines is considerable, because the injection is effected under unfavorable conditions. For instance, in order to obtain an output of the order of 6,000 packings an hour, it is necessary, in order to secure a reliable injection, to avail of a 50-ton compressor, the operation of which requires about 15 H. P.

Moreover, if with the aforementioned known machines the diameter of the packings has to be varied to order, whole sets of variously sized and shaped molds have to be kept in stock. Now, such molds are comparatively expensive, which means that such machines do not satisfy the economic requirements of a quick production of diverse articles on comparatively small scales.

Besides, with the aid of said machines, it has not yet been possible to satisfactorily manufacture articles less than one gram in weight.

My invention relates to an automatic multi-mold injection-moulding machine which is capable of producing extra light parts, weighing as little as a few decigrams, in rapid succession, each part being cast as a rule individually in one single mold and practically with almost no scrap.

As compared with machines known in the art, my injection-moulding machine affords the following primary advantages:

(1) Unlike the known machines which are unable to proportion the amount of material injected, which is strictly dependent on the capacity of the mold, it will ensure an extremely accurate proportioning owing to the special injecting method I use therefor.

(2) In an 8-mold machine, as many as 60 to 120 injections can be effected per minute.

(3) Owing to the injection being extremely accurate and rapid, very thin parts can be obtained, the thickness of which may be as small as 0.2 mm. and the weight as light as 0.3 g.

(4) The injection pressure is considerably less and requires no compressor, which means that the molding plant is simplified considerably.

(5) Consequently, the locking of the molds is facilitated all the more. As a result, thin-walled molds can be used without involving the occurrence of "fins" or misshapes. The operation of the machine requires pressures of no more than a few hundred kilograms instead of about 50 tons.

(6) The formation of drops at the outlet of the injection nozzle is done away with.

(7) Lastly, the temperatures which usually are found necessary can be lowered considerably, which removes the material from the risk of getting charred; same will thus retain its original properties and remain more flexible. Consequently, the finished parts have a better appearance while their flexibility and strength are increased.

As far as the injection process is concerned, the machine according to my invention applies the method and the arrangements described in the patent filed in France Nov. 14, 1953, under application No. 658,141, Specialites Alimentaires Bourguignonnes (S. A. B.) for "Method and Device for Jet-Casting Plastic Materials," and in the U. S. application Ser. No. 407,420, filed February 1, 1954.

For example, an 8-mold machine according to my invention using the device described in said patent is capable of producing such parts as packings for use in capping vessels and weighing from a few grams to a few decigrams at the rate of 60 to 120 injections a minute, the power necessary therefor being of the order of one H. P., inclusive of the power consumed by the injection device which is incorporated in the machine.

The scrap—which anyhow can be re-used—is reduced to as little as about 0.025 g. per part, irrespective of the weight of said part. Said scrap is constituted by the head present in a very narrow duct which connects the outlet of the injection pot with the inlet of the mold. A most remarkable feature of the machine is that said head is cut automatically from the part and ejected before the finished part is delivered. It can be re-used directly, that is, without a new crushing, on account of its very small size, which is of the order of a grain of the raw molding mass.

The machine includes a horizontal circular turntable on which the molds are arranged at equal distances from one another and from the centre. The turntable is driven into rotation by a motor and, by means of a suitable mechanism such as a Geneva movement, the turntable is stopped every time it has been rotated the amount corresponding to the angular distance between two successive molds. Arranged above one of the stopping positions of the molds is the injection device which is actuated by the turntable driving motor. In this position the mold is locked in engagement with the injection nozzle, ready for the injection step. Thereafter the turntable is rotated one eighth of a round, as a result of which the next mold is stopped below the injection nozzle while the former is stopped at a cooling station, and so on. After one or more stops the molds which has been filled first arrives at a so-called head-removing station, then at a station, after which it comes back to its position below the injection pot, ready for a new injection step. The same cycle of operation is then repeated, with the result that every time the turntable stops material is injected in one mold, a head is cut away in a further position and a finished part is ejected from the mold standing in the third position.

An 8-mold machine according to my invention will now be described for the purpose of exemplification and by no means of limitation, it being understood that the various mechanisms described as suitable for the performance of the various functions of the machine may be replaced by equivalent mechanisms without thereby departing from the scope of my invention.

The example of operation described hereinafter relates to the manufacture of packings and the molds illustrated are designed in accordance. Besides, the turntable is so designed that it can easily and quickly be converted for the accommodation of molds for the production of differently shaped parts.

My machine is illustrated in the drawings appended hereto, in which:

Figure 2 is an elevational and partly sectional view, taken on line 2—2 of Figure 1, with certain parts omitted for clearer showing of the two molds positioned at stations I and V respectively.

Figures 3 and 4 are fragmentary diagrammatical views, partly in elevation and partly in section, taken on line 3—3 of Figure 2 showing the mechanism for locking and unlocking of the molds.

Figure 5 is an enlarged vertical sectional view showing the supply of the injection pot with raw material.

Figure 6 is an enlarged partly sectional detail view of a mold assembly and injection pot in the position I and showing parts omitted in Figure 2.

Figure 7 is an enlarged fractional plan view of a portion of the machine corresponding to the stations V, VI and VII with detail omitted from stations V and VII.

Figure 8 is an enlarged fractional vertical section view of the mold assembly and operating connection taken at position V and showing parts omitted in Figure 2.

Figure 9 is an axial sectional view through station VII.

Figure 10 is a plan view of the head plate swinging means shown at the end of the operation in position V.

Figure 11 is an end view from the left of Figure 10.

Figure 12 is an elevational view of the head-ejecting means at station VI with the position of bracket 90 moved and shown diagrammatically with other connected parts omitted to allow clearer showing of remaining positions.

Figure 13 is an enlarged view of the same means as shown in Figure 7 together with the part-ejecting means, station VII being in the foreground, at the left, and station VI to the right in this figure.

Figure 14 is a diagrammatical view in layout plan of the spiral cam of the mechanism shown in Figure 13.

Figure 15 is a detail view of a modification of the head-ejecting nippers.

Figures 16, 17, 18 show the means to hold the upper mold carrier during the ejection of the finished part in elevational, plan and perspective view respectively.

Figure 20:
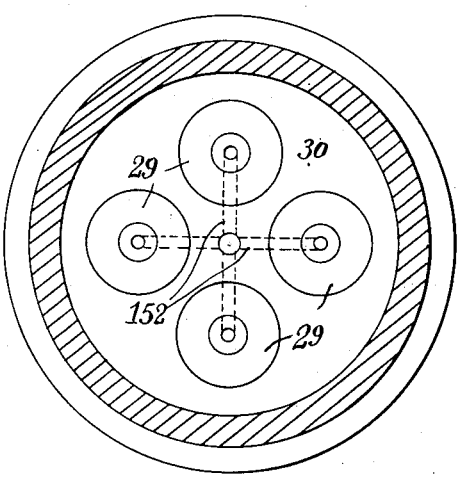
Figure 21:
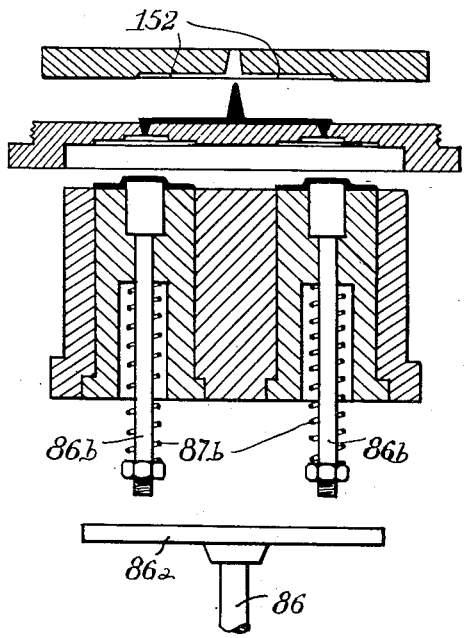

Figures 20 and 21 diagrammatically show a modification in which each mold carrier includes a plurality of molding cavities.

Parts above the head plate shown in Figures 6, 7, 9, 10 and 11 are omitted for greater clarity in Figures 1, 2, 8, 12 and 13. Reference will now be had to the drawings.

Secured to a floor 1 are uprights 2 braced together by plates 3, 4, 5, 6. Depending from the lowermost plate 3 is a motor 7 bolted to a plate 8 hinged at 9. A belt 10, stretched by the weight of the motor same drives the pulley 11 of a step-down gear 12 the shaft 13 of which carries cams 14, 15, 16 together with a disc crank 17 and a bevel gear wheel 18 which meshes with a companion bevel gear wheel 19 keyed on a vertical shaft 20. Said shaft 20 carries a roller crank 21 adapted to drive an 8-slot Geneva movement 22 keyed on the shaft 23 of the machine. Consequently, every time the shaft 13 accomplishes one revolution the Geneva movement will be shifted through an angle equal to 1/8 of a revolution, after which it will stop for a while.

Keyed on shaft 23 is a turntable 24 bored with guides for mold carriers 25. Slidably received in bores 26 are stems 27 interconnected at their bottoms by a bracing plate $27_1$ (see Fig. 17). Each mold is composed of two halves, viz.: a bottom mold half 28 which is screwed in the mold carrier 25 and a top mold half 29 which is screwed in a mold carrier plate 30 secured to the upper ends of stems 27 and partaking of their vertical reciprocatory motion. Resting on each plate 30 is a head plate 31 the purpose of which will be explained later on.

Figure 1:
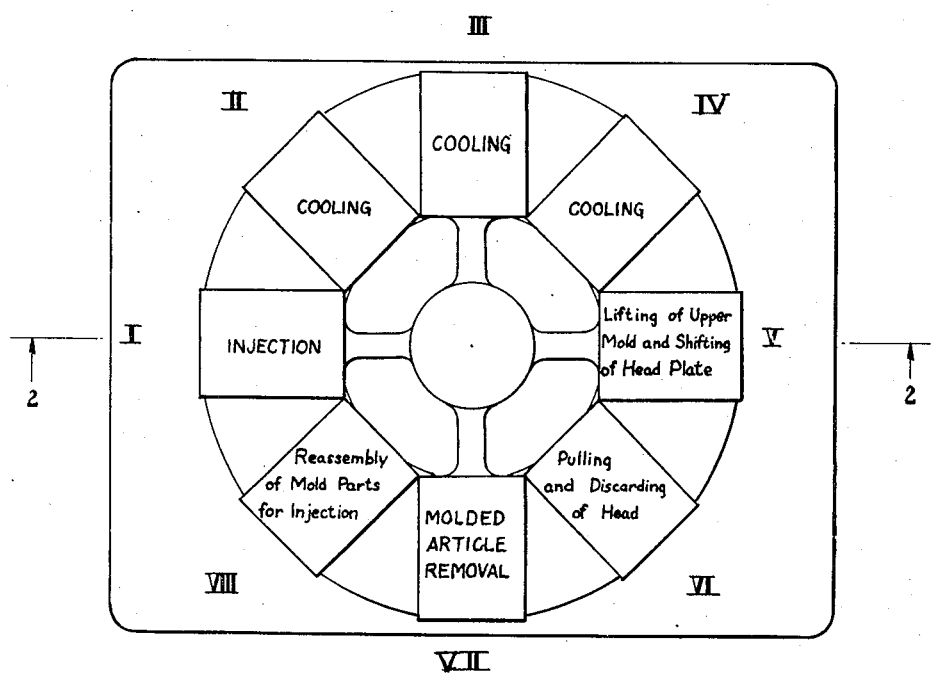
Figure 1 is a diagrammatical plan view of the machine taken on line 1—1 of Figure 2 showing the various mold stations numbered I to VIII.

The various stations at which the molds are stopped successively by the Geneva motion are indicated at I to VIII in Fig. 1.

Position I is the injection position; positions II to V are cooling positions; between positions V and VI the head plate 31 is lifted and shifted aside and the upper mold half 29 is raised tearing the sprue away from the molded article which is retained in the lower mold; at position VI the sprue head and tail are removed from the upper mold and expelled; at position VII the molded article is stripped from the lower mold and ejected, and the head plate 31 is swung back into position; between positions VII and VIII the upper mold half 29 and the head plate 31 are lowered and at position VIII the two mold halves and the head plate are reassembled in preparation for a new injection at position I.

The head plate 31, the upper mold carrier 30 and the lower mold carrier 25 are provided inside with a water cooling system as shown in Fig. 2. The head plate 31 water cooling system is shown by broken lines in Figure 10. Only the water inlet and outlet pipes for the two molds shown in Fig. 2 are shown at 32 and 33. The water is led through a fluid-tight box 34 which partakes of the rotation of the turntable 24 and is connected through chambers 35 and 36 with the fixed intake and outlet pipes 37, 38.

The various parts and mechanisms necessary for the performance of the manufacturing process will now be described more specifically.

Station I is the one at which the material is injected. There, the two mold halves are firmly pressed against each other at the same time as they press the head plate—through which the injection is effected as will be described later on—against the injection pot in such a manner that no leakage of material shall occur consequent to the injection pressure.

The locking and unlocking of the molds are effected by means of a cam 14 with the aid of a mechanism shown in elevational view in Figs. 3 and 4. The cam 14 is formed with two bosses 39, 40 which are axially offset relative to each other. Said bosses cooperate respectively with rollers 41, 42 carried by the arms of a bell crank lever 43, 44 pivoted on a pin 45. A further arm 46 of said lever is pivotally connected to a link 47 which in its turn is pivoted to a toggle joint 48—49. The link 48 of said toggle is pivoted at 48a to a rod 50 slidably mounted in a guide 50a arranged below the lower mold carrier 25. The link 49 is pivoted at 49a to the fixed plate 4. The pins 48a and 49a are arranged in vertical alignment. By design, when the boss 39 cooperates with the roller 41 as shown in Fig. 3 the links 48 and 49 are substantially in alignment with each other, with the result that the mold halves are tightly pressed against one another while pressing the head plate 31 against the injection pot 51. The rod 50 will only be moved to unlocking position (see Fig. 4) by the action of the boss 40 upon the roll 42 once the cam has been rotated in the direction shown by the arrow $f_1$. It is only thereafter that the turntable 24 is moved on one step and the next mold is substituted for the former.

Preferably, the rod 50 is made up of two sections which for instance may be screwed in one another in order that the overall length of the rod 50 can be adjusted.

The injection pot is supplied with plastic material in the following manner (see Fig. 5).

A hopper 60 communicates at its bottom with the upper end of the injection pot 51. By means of a reciprocated slide 61 a definite amount of material is urged leftwards as seen in Fig. 5 and caught by a feed piston 62 which in its downward stroke forces it into the injection pot. The reciprocation of said feed piston 62 is effected by means of a lever 63 pivoted on a pin 64 and moved by a rod 57. The movement of the lever is transmitted through a block 65 slidably mounted on a rod 53 and through a spring 66 to the aforesaid piston 62. When too much material tends to accumulate in the pot the spring 66 will yield to the pressure and the stroke of the piston be shortened correspondingly. A vertically adjustable catch 67 acts through a bell crank lever 68 and a rod 61a upon the slide the stroke of which is thus related to that of the piston and which makes it possible to adjust the feed. A spring 61b returns the slide 61 to its original position after the bell crank lever 68 has been released by the catch 67.

The injection is effected at station I in the manner described in the aforementioned patent.

The injection device is represented generally in Fig. 2 and more particularly in Fig. 5. The injection process is recalled briefly hereinafter. The injection piston 52 is rigid with a piston rod 53 which is reciprocated by means of a lever 54 pivoted on a fixed pin 55 and of a link 56. The end of lever 54 is pivoted to the upper end of a vertical rod 57 the lower end of which is pivoted to a link 58 connected through a link 58 to the wrist 59 of a disc crank 17 as shown in Fig. 2. Consequently, the piston is reciprocated every time the disc crank accomplishes one revolution, that is, every time the molds are moved on one step. The wrist 59 is so located that the downward movement of the piston 52, which corresponds to the injection step, will occur during the time the mold is staying still and locked. The amount of material fed is adjusted by any suitable means adapted to control the stroke of the piston.

Figure 19:
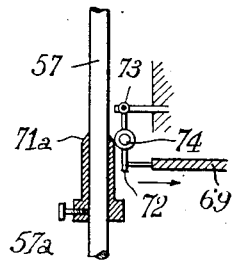
Figure 19 is an enlarged view of a detail of Figure 2.

As described in the aforementioned patent, a slide valve is provided within the injection pot close to the injection orifice and adapted automatically to close the same consequent to the suction effect resulting from the upward displacement of the piston. For an increased safety in operation the machine according to this invention includes means (see Figs. 2 and 6) by which the closing is effected positively with the aid of slide valve 69 which acts as a gate as shown in Fig. 19. Secured on the rod 57 by means of a set screw 70 is a vertically adjustable sleeve 71 formed with a chamfered upper end 71a. Carried by a lever 72 pivoted on a pin 73 is a roller 74. When during the upward displacement of the rod 57 the chamfered end 71a of the sleeve engages said roller 74 the needle 69 is moved to the right and remains in this position until in the downward stroke of the rod 57 the sleeve 71 clears the roller 74, when the needle is forced again leftwards by the pressure exerted on the end of the same by the material to be injected.

The device can be so adjusted that the valve will remain closed for a short while after the piston has begun its downward injection stroke, in order to subject the molten plastic material to an overpressure and thereby to secure an extremely rapid injection.

As stated hereinbefore, the material is injected through a so-called head plate 31 the function of which will now be described more specifically, reference being had to Fig. 6 in which said plate is shown in injection position, in which it is squeezed between the upper mold carrier 30 and the injection pot 51. Said head plate is bored with a frusto-conical orifice 75 which extends between the injection nozzle 76 and the downwardly flaring inlet 77 bored through the upper mold half 29 and leading to the molding cavity delimited on the other hand by the lower mold half 28, which together with head 119 is designed for the molding of sealing caps.

As the material is forced downwards the needle 69 is forced leftwards owing to the pressure exerted thereupon through the by-pass 79, whereupon the material is fed into the space between the two mold halves 28, 29 and forms the article 81 which remains solid with the sprue consisting of a head formed in orifice 75 and a tail formed in inlet 77. What material is still present in the nozzle 76 is sucked up by the piston whereas the head which is chilled by the intense cooling of the head plate 31 is held down owing to its frusto-conical shape. The head will be severed from the material in the injection pot in the unlocking step, when the two mold halves and the head plate are disengaged from the nozzle.

The purpose of the head plate is to form the frusto-conical head at 75 and to cool it quickly so that in a subsequent step to be described later on said head and the tail 77 of the same can be detached flush with the finished article.

The mold is unlocked immediately after the injection process as explained hereinbefore and the turntable 24 is moved onwards one step, whereby an empty mold is substituted for the one just filled. In this manner, the latter and the article therein are conveyed stepwise to station V.

There, the head plate 31 is lifted and swung aside so that the now solidified head extending through the upper mold half can conveniently be removed.

Owing to the frusto-conical shape of the orifice 75 in the head plate 31, the mere lifting of the head plate 31 followed with the angular displacement imparted thereto are sufficient to expose the sprue head, which action will now be explained more specifically with reference to Figs. 6, 8, 9, 10 and 11.

Up to that time, the head plate 31 had been pressed against the upper mold carrier 30 by means of a spring 175 (see Fig. 8) rested on a ring 176 pinned to the lower end of a stem 177. The mere lifting of said stem against the action of the spring 175 is sufficient to disengage the head plate 31 from the plate 30. This result is obtained with the aid of a horizontal arm 178 in a manner to be described later on. The end of said bar comes into engagement with a vertical stem 179 and lifts the same against the action of a spring 180.

On the other hand, the plate 31 had been held in its injection position by a catch 181 formed with a pair of steps 182, 183 (see Figs. 10 and 11). The plate 31 is pressed against step 182 by a spring 184. Once said plate 31 has been lifted clear of plate 30 it is snapped by the action of spring 184 into engagement with the upper step 183, thus clearing the top of the head which now projects from the upper face of the top mold half 29 held by carrier 30.

The stripping is effected at station VI consequent to the lifting of the top mold half and to the ejection of the article 81 out of the bottom mold half. With this end in view, an undercut is provided in the periphery 118 of the latter so that the article will be retained therein at its edge as it is cleared by the top mold half. Because the cross-sectional area of the bottom of the tail, formed in inlet 77 is small, the tensile strength of the sprue at this point is slight in relation to the resistance to upward movement by the molded article held by bottom mold half 28 which is the result of the relatively large area of the rim which is undercut at 118 (Figure 9), the sprue therefore breaks off from article 81 and is carried up with the top half of the mold to subsequently be removed and discarded as described below.

The top mold half is lifted clear of the article by means of a cam 16 visible in Fig. 12. The action will be explained with reference to Fig. 12.

A lever 85 actuated through a follower by the cam 16 is effective to lift a stem 86 guided vertically through the plates 4 and 5 against the action of a spring 87 compressed between the plate 5 and a collar 88. Secured to the upper end of stem 86 is a plate 89 above which the plate 27₁ bracing the two stems 27 that carry the upper mold half 30 has come into position. The upper mold half is thus lifted.

It will be remarked that in the course of this action the arm 178 rigid with stem 86 has been moved upwards to lift stem 177 and disengage head plate 31, as described above. The position of said arm on the stem 86 is so adjusted that the lifting of plate 31 clear of the top of the head will only occur towards the end of the lifting of the upper mold half.

The head is removed at position VI with the aid of the mechanism described hereinafter.

As shown in Figs. 12 and 13, a vertical shaft 91 rotatably mounted in a bracket 90 rigid with the plate 5 carries a horizontal cross bar 92 provided at either end thereof with nippers located at equal distances from the axis of shaft 91, each of which includes a fixed jaw 93 and a movable jaw 94 pivoted at 95. The heels of jaws 94 are interconnected by a spring 96 by which the nippers are urged to closed position. Rigid with the lower end of shaft 91 is a sleeve 97 formed with a pair of helical grooves 98, 99 the pitches of which are equal yet located at an angular distance of 180° relative to another. The upper end of each groove is connected with the lower end of the companion groove through a longtitudinal groove 100, 101 respectively as shown in Fig. 14. The purpose of said sleeve 97 is to convert the reciprocatory motion of the plate 89 into an alternating rotary motion of the shaft 91.

Fig. 14 shows the development of the sleeve as cut along a generatrix X—X while Fig. 18 shows the mechanism by which the said movement is obtained. Secured on plate 89 is a box 102 which contains a spring-loaded push rod 103 urged to engage one of the grooves 100, 101. The depth of either longitudinal groove decreases from its lower end to its top where it meets the related helical groove.

For instance, when the plate 89 occupies its lowermost position, the push rod 103 is engaged in the bottom end of groove 100. As the plate 89 is lifted, the push rod 103 slides upwards undisturbed in the groove 100, which means that the sleeve 97 is not rotated.

Upon the push rod reaching the upper end of groove 100 it is snapped by its loading spring into the portion 100a of the groove, the depth of which is equal to that of the helical groove 99. As the push rod is moved downwards a pressure is exerted thereby upon the lower flank 99a of the helical groove, whereby the sleeve is turned in the direction shown by the arrow. The push rod then leaves the groove 100 and after it has run down the helical groove 99 it is snapped by its loading spring into groove 101 past the step 104, after which the same action is repeated in the groove 101 and the helical groove 98, and so on.

The head is removed as follows:

The nippers shown in the right portion of Fig. 13, by encountering a fixed cam face 105 rigid with an upright 106—see Fig. 7—is thrown open. During the following half turn they are held open by a spring leaf 105a. At the moment when the upper mold-carrying plate 30 reaches its highest position a pin 107 is moved upwards thereby which in its turn causes the spring leaf 105a to escape the shoulder 108 of the movable jaw 94 of the nippers, when same will nip the head owing to the action of the spring 96. Consequent to the now beginning downward displacement of the upper mold carrier 30, the head is severed from the article flush therewith; the head remains firmly held by the nippers which are started once again for a new half turn. They are thrown open and caused to drop the head as they encounter the cam face 105 anew. In this manner, each pair of nippers will come into action alternatingly, one of them nipping a head while the other drops the head nipped off from the preceding mold.

According to a modification shown in Fig. 15, both jaws 93, 94 of the nippers are swingably mounted on pins and mesh with each other by means of toothed sectors 93a, 94a, with the result that the head can be caught symmetrically relative to its own axis. A catch may be provided on the path of the open nippers to cause the head to fall in the event a head should remain clung to the one jaw of the nippers.

With the upper mold half in its lifted position, it is necessary to keep it in the said position throughout the next step in the movement of the turntable 24 in order that the finished article can be removed from the lower mold half.

The way in which the upper mold half is transferred from sation VI to station VII in its lifted position is shown in Figs. 16, 17 and 18.

This result is obtained with the aid of a horizontal guide 111 carried by an upright 110 a little below the base of the plate 27₁ in lifted position. On said guide will slide the bracing plate 27₁. In order that the guide can find its way below said plate at station VI the guide 111 carries, flush with its upper face, a sector 112 swingably mounted on a shaft 114. Secured on the shaft 114 rigid with guide 111 is the inner end of a coil spring 115 the outer end of which is rested on a pin 116 rigid with sector 112. Said spring urges the sector 112 clockwise and the latter is stopped due to the engagement of pin 116 into a notch 117 in the guide 111. In Figure 18 as the foremost upright 27 reaches the position 27ᵥᵢ at station VI (see Figs. 17 and 18) it engages the edges of sector 112 which yields slightly to the pressure by swinging about its axis. As the plate 27₁ is lifted by plate 89 the upright 27 which is in position 27ᵥᵢ runs along the edge of sector 112 until plate 27₁, which is rounded to match the round of upright 27, clears sector 112. At this moment sector 112 is snapped clockwise below the leading end of plate 27₁. Said plate is thus held in raised position by sector 112 and thence by the guide 111 during the transfer from station VI to station VII, upright 27 standing in position 27ᵥᵢᵢ as shown in Fig. 18.

As the bracing plate 27₁ is moved along the guide 111, a finger 177a carried by stem 177 (see Fig. 9) comes into engagement with a catch 111a rigid with guide 111. Said catch swings shaft 177 and head plate 31 counterclockwise while stressing spring 184 (see Fig. 10). Upon the plate 31 escaping the step 183 said plate is returned downwards by spring 175 into engagement with the upper mold-carrier 30 (see Fig. 9). The plate then abuts the step 182 and is restored to the position in which it is ready for a new injection.

How the article is stripped and ejected is represented in Figs. 7 and 9. Projecting through the lower mold half 28 and the mold carrier 25 is a rod 80 with a head 119 of which is exactly fitted in the mold, said head providing part of the mold bottom. The rod 80 is urged downwards by a spring 120 which thereby keeps the head 119 in engagement with the corresponding shoulder of the mold. At station VII the rotation of the cam 15 (see Fig. 1) lifts a stem 121 (see Fig. 9) which carries a push rod 122 adapted to lift the rod 80 together with the finished article resting thereon up to the position shown in dotted lines. The undercut rim 118 on the periphery of the mold bottom holds article 81 in place on the mold bottom while the top half of the mold is lifted. When ejector head 119 is pushed up it produces a slight upward elastic deformation in article 81 sufficient to release it from the undercut of ring 118. Immediately after the completion of this ascending movement a shovel 123 which is cut away in order that the head 119 can pass therethrough in its downward stroke and which is carried by an arm 124 swingably mounted on a pin 125 at the top of bracket 90 has come into position below the head 119 in a rotational motion which is obtained as follows:

At rest, the arm 124 is held at a distance from the lower mold carrier 24 in the position shown in Fig. 7 by a latch 127 visible in Fig. 9 adapted to resist the action of a spiral spring 125' wound around the pin 125. The latching system is constituted by a bellcrank lever pivoted at 126 and the arm 127 of which is moved upwards by a spring 128 into engagement with the aforesaid shovel 123. At the end of the upward displacement of the stem 121 a slide 129 carried thereby cams the arm 130 of the bell-crank lever leftwards, with the result that said lever is rocked clockwise. The shovel 123 thus escapes the arm 127 and owing to the action of the spiral spring 125' is snapped into position below the article 81 while straddling the rod 80 in the slot 131 cut therein. Owing to the rotation of the cam 15 said rod 80 is immediately moved downwards to lay the article 81 upon the shovel 123. Consequent to the abrupt engagement of the projection 132 of the turntable 24 (see Fig. 7) with the finger 133 keyed on shaft 125, the latter is rocked suddenly, as a result of which the article is whirled into a suitably arranged receptacle. In the backward movement of the shovel 123 (see Fig. 9) same slides on the arm 127 past the end of the same. Said arm is then lifted by the action of spring 128 to keep the shovel 123 which now is once more ready for the ejection of the next finished article.

In the continued rotation of the cam 15 the head 119 comes back into position within the lower mold half; stem 177 is similarly lowered consequent to the rotation of the cam 16 and the mold which is reconstituted due to the refitting of the two mold halves with each is ready for a new injection.

Between station VII and station VIII the plate 27₁ sinks down ramp 111a of guide 111 (see Figs. 16, 17, 18), contingently with the aid of a return spring, to its lowermost position at station I, where it is again ready for a new cycle of operation.

Means are provided to stop the motor in the event anything should go wrong. More particularly, a circuit breaker which is acted upon by the top portion of the upper mold carrier is interposed in the path of the molds and is effective to disconnect the motor in the event any obstacle, e. g. an unejected article, should prevent the two mold halves from exactly matching each other again.

A machine in which the same constructional principles as set forth with reference to Figs. 1 to 19 are applied, except that each mold carrier 25, 30, carries a plurality of molding cavities—e. g. four of them as shown—instead of a single one, is illustrated in Figs. 20 and 21.

The molding cavities—each of which corresponds to one of the afore-described mold halves 28, 29—are fed jointly from a central injection pot 151 designed and operating as described in the aforementioned patent through radial channels 152.

The molds are lifted by means of a disc 86a carried by a rod 86 similar to the one shown in Fig. 12 and acting upon individual spring-loaded stems 86b.

Here again, the material is injected through head plates which perform the same function as the aforedescribed plates 31.

The head plates are lifted clear of the heads, then the upper mold carriers lifted, then the heads nipped away, then the articles stripped and whirled off just the same as described with reference to Figs. 1 to 19, it being understood that the mechanical modifications involved by the presence of manifold molding cavities in either mold half. More specifically, it is important that the articles should not be delivered as a cluster; they should rather be obtained singly and detached from the rootlets corresponding to the ducts 152.

By thus feeding a manifold mold through a common injection pot the capacity of the machine can be multiplied without any substantial changes in design. Now, it is precisely due to the accuracy of the feed and to the low power consumption of the machine that same can be operated at its normal cadence while increasing its output since, in the example discussed with reference to Figs. 20 and 21, a machine including eight fourfold molds will produce 32 parts in each revolution of its turntable.

I claim:

1. A machine for molding objects of plastic material, comprising a fixed injection pump with a delivery orifice, means for storing pulverulent material and for transforming said material into liquid, a turntable rotatable about a vertical axis, a plurality of molds each comprising a head plate having an orifice extending therethrough, an upper mold element having an orifice therethrough and a lower mold element, carried in an upper and lower mold carrier respectively, said molds being angularly spaced around the periphery of said turntable, means for moving the aforesaid turntable by fractions of a turn equal to the angular interval between successive molds and stopping said turntable at predetermined stations, means for pressing said mold elements against said head plate and the latter against the injection pump with their orifices registering, and means for injecting said material through said orifices in a predetermined quantity substantially equal to the volume of the piece being molded, means for raising the head plate and shifting it angularly in relation to said upper mold, means for raising and holding raised said upper mold element, means for severing the head and tail from the molded article, means for eliminating the head and tail, means for ejecting said molded piece from said mold, means for discharging it from the machine and means for returning said head plate and said upper and lower mold elements to their respective initial positions.

2. A machine according to claim 1, wherein said means for pressing said mold against said head plate and said head plate against said injection pump comprises a cam shaft including a rotatable cam, a lever arranged to be operated by said cam, two bosses on said cam being spaced angularly and arranged to operate each with a corresponding arm of said lever whereby to oscillate said lever alternately first in one direction and then in the other, a connecting rod actuated by a third arm of the same lever, a toggle actuated by said connecting rod and anchored to a fixed axis at one end, the other being joined to a vertical sliding rod adapted to engage said lower mold element, said cam shaft arranged to execute a complete turn while said turntable rotates through the angle between two consecutive molds, one boss on said cam being adapted, when engaging its corresponding lever arm and thus extending its position, to actuate said rod to raise said lower mold element, thereby forcing said upper mold element and said head plate against said injection pump.

3. In further combination with the machine described in claim 2, an apparatus including an injection pump comprising a vertical cylindrical supply chamber widened at the top to receive solid pulverulent plastic material, heating means for changing the solid material into a readily flowable state as it progresses toward the bottom of said chamber, an injection chamber arranged to receive the flowable plastic, an intake valve for controlling material coming from the said supply chamber and entering said injection chamber, an outlet valve for closing said injection chamber an injection orifice located beyond said injection valve, means to increase the pressure in said injection chamber, means for controlling the supply of material moving from said injection chamber to said injection orifice including means for opening the intake valve when the outlet valve is closed whereby flowable plastic will be introduced into said injection chamber, means for opening the outlet valve whereby said flowable plastic is injected into a mold, and means to create a suction pressure in the injection chamber whereby plastic material remaining in injection orifice and the outlet valve is drawn back into said injection chamber, means for closing said outlet valve and means for drawing through the intake valve into said injection chamber a new quantity of flowable plastic.

4. In the apparatus described in claim 3, in further combination with means for injecting a predetermined quantity of flowable plastic into molds, for supplying, after each injection, the supply chamber with a corresponding quantity of solid matter, said means comprising a crank, a link attached to said crank, and a rod to which said link is joined whereby said rod is vertically slidable, a first lever arranged for reciprocating oscillation about a fixed point on the machine and said first lever is joined at one end to said rod and joined at the other end to the fixed point on the machine, a piston rod connected to a point on said reciprocating first lever through a short link, said piston rod being vertically slidable and connected at the lower end thereof to said intake valve, a second lever arranged for see-saw oscillation about a fixed point on said machine one end joined to said rod and the other end to a slidable coupling which surrounds said piston rod, a slidable cylindrical ram having a vertical passage through which slides said piston rod, said ram connected to said second lever by a spring interposed between said second lever and said ram, said ram having an exterior diameter essentially equal to the interior diameter of said supply chamber whereby said ram can slide into said supply chamber, said ram being of such length that when it is retracted to its uppermost position its lower end emerges from said supply chamber, a catch of adjustable height, which forms part of said ram, a crank lever arranged to cooperate with said catch, a slide rod connected to said crank lever, means connected to said slide rod, for pushing the solid material in a horizontal passage into the supply chamber, a spring for returning said slide rod; an injection valve in the lower part of said injection chamber comprising a slidable rod arranged to move in a horizontal bore transverse the injection opening arranged to move between two positions one which opens and the other which closes the injection orifice, a passage leading from the end of said horizontal bore to said injection chamber whereby the ascent and descent of said piston in said injection chamber draws and forces back said slidable rod thus opening and closing said injection orifice.

5. In a machine according to claim 4, in further combination with said means for injecting a predetermined quantity of flowable plastic means for actuating said injection valve comprising a sleeve on said rod, a lever, a roller mounted on said lever and connected to a sliding gate in said outlet valve, said sleeve and roller being engaged on the movement of said rod whereby said sleeve acts as a cam forcing said roller toward said outlet valve and thereby moving said gate to its closed position.

6. In a machine according to claim 1, the arrangement of elements comprising, a horizontal turntable rotatable about a fixed vertical axis, a plurality of molds at spaced positions on said turntable each comprising an upper mold element, a lower mold element, a head plate carrying said upper mold element, two columns carrying said plate, vertical slide-bearings for said columns located in said turntable between said vertical axis and said mold, a bracing plate connecting the lower ends of said columns, lifting means for raising said upper mold element and said head plate, said lifting means being located at one fixed position of said turntable whereby said upper and lower mold elements of each mold are separated when at said position, said lifting means comprising a vertical stem, a platform secured to top of said stem, with means at one end of said platform to engage said bracing plate, a cam engaging said stem to force it upward to engage said bracing plate and lift said columns thus moving said upper mold element and said head plate up and away from said lower mold element.

7. An injection molding apparatus comprising a horizontal turntable having a plurality of molding positions, said turntable rotatable about a vertical axis, a pivoted and vertically movable head plate having an injection orifice therethrough, an upper mold carrying plate and a lower mold carrying plate located at each of said plurality of molding positions on said turntable carrying respectively upper and lower mold elements adapted to be brought together into a mold for receiving flowable plastic, said upper mold element having an orifice arranged to be aligned with the orifice of said head plate through which the plastic enters said mold, a column-supporting said head plate and arranged to move vertically through said turntable whereby said head plate can be raised and lowered, a spring biasing said head plate out of the position of alignment with the orifice of said upper mold element, a two-part stop with its said parts one above the other, the lower one being positioned to hold said head plate with its orifice in alignment with the orifice of said upper mold element when said head plate is in a lower position, and the upper stop being adapted to allow the head plate to swing away from said upper mold orifice when in its raised position, a finger fixed to said head plate and extended from its pivot axis, a fixed abutment positioned to engage said finger upon the rotation of said turntable and thereby to swing said finger and its head plate against the bias of said spring thereby resetting said head plate with its orifice in alignment with the orifice of said upper mold.

8. In an injection molding machine as defined in claim 7 in which a head and tail, generally referred to as a sprue, is formed by the solidification of the plastic material in said orifices, said head being exposed after further raising and swinging said head plate up and away from said upper mold while said head plate and said upper mold are in their raised positions, means for extracting and eliminating said head and tail from said upper mold, said means comprising a T-shaped device, a pair of pincer means attached to each arm of said T, each adapted to grasp said head when said pincer means is located over the head and when said rotatable turntable has stopped, the other of said clipping means adapted to drop the previously extracted head and tail when it reaches a position opposite to that of said extraction.

9. In an injection molding machine as in claim 8 including means for separating said upper mold element from said lower mold element, means for raising the molded product out of the lower mold comprising a vertical rod slidably carried in said lower mold element and extending through said lower mold carrying plate, said rod downwardly biased, a push rod mounted on said machine and arranged at a separating station to engage the lower portion of said vertical rod, a cam operated stem connected to said push rod whereby upward movement of said cam operated stem causes said push rod to engage said vertical rod and force the molded product out of said lower mold.

10. The combination as in claim 9 including means for ejecting the molded product out of the machine comprising an ejecting shovel pivotally mounted on said machine beyond the periphery of said turntable and biased toward the vertical axis of said turntable, a movable arm arranged to engage said shovel and hold in locked position away from said turntable, a vertically slidable stem arranged to engage said arm unlocking said shovel so that said shovel is free to swing said vertical rod slidably carried in said lower mold element being also engaged by said stem so that the molded product is lifted out of said lower mold prior to the unlocking of said shovel whereby the molded product is transferred to said shovel, a finger connected to said shovel and arranged to be engaged by the extremity of said turntable so that finger is engaged and urged outwardly by the rotation of said turntable whereby said shovel is returned to its locked position away from said turntable.

11. The machine in claim 8 in further combination with a means for turning said T-shaped device 180 degrees and stopping said device when said turntable is at a standstill position, said turning means comprising a shaft connected to said device, helicoidal and vertical grooves cut in said shaft and arranged in a pattern around the periphery of said shaft in relation to the axis thereof, a finger acting against said grooved shaft so that vertical movement of said finger is translated into an intermittent rotary movement of said shaft.

12. In an injection molding machine a horizontal turntable rotatable about a vertical axis, a plurality of molds at spaced positions on said turntable and corresponding stations on said machine at which work is performed upon a molded product, each of said mold positions comprising an upper and a lower mold element, an upper and a lower mold carrier, a head plate, and a work station comprising means to maintain said upper mold element in a raised position during the rotation of said turntable from one station to a subsequent station, said means comprising a horizontal guide, a horizontally pivoted sector forming part of said guide and located at one end thereof, a spring urging said sector in a clockwise direction so that said sector extends beyond said guide, a vertically movable stem carrying said upper mold carrier arranged to engage said sector upon movement of said turntable and force said sector in a counter-clockwise direction, a brace plate supporting two adjacent vertical stems arranged to move vertically to separate said upper and lower mold elements and said stem and brace plate so located in respect to said sector and guide that said sector will return to its maximum clockwise position as said brace plate is elevated to its maximum position then upon downward return of said brace plate said sector and guide will maintain said brace plate in raised position during rotation of said turntable.

13. An injection molding machine according to claim 12 including lowering means for returning said mold elements and said head plate to their initial positions comprising an inclined ramp leading from said horizontal guide so that said brace plate slides down said ramp as said turntable rotates thereby bringing said head plate, said upper and lower mold elments together resetting for injection molding.

References Cited in the file of this patent
UNITED STATES PATENTS

| | | |
|---|---|---|
| 2,274,279 | Shaw | Feb. 24, 1942 |
| 2,327,227 | Tucker | Aug. 17, 1943 |
| 2,436,122 | Rotsler | Feb. 17, 1948 |
| 2,569,174 | Kardorff | Sept. 25, 1951 |
| 2,587,070 | Spillman | Feb. 26, 1952 |